UNITED STATES PATENT OFFICE.

KARL LANGENBECK, OF WASHINGTON, DISTRICT OF COLUMBIA

METHOD OF DECOLORIZING KAOLIN, CLAY, &c.

No. 893,590.      Specification of Letters Patent.      Patented July 14, 1908.

Application filed September 17, 1907. Serial No. 393,417.

*To all whom it may concern:*

Be it known that I, KARL LANGENBECK, a citizen of the United States, residing at Washington, in the District of Columbia, have invented certain new and useful Improvements in Methods of Decolorizing Kaolin, Clay, &c., of which the following is a specification.

The object of this invention is to provide a method of treating kaolin, clay, glass-sand and like materials for the purpose of eliminating the objectionable coloring matter or of reducing the proportion or coloring effect of the same, whereby the material is rendered more available for certain technical uses.

The invention will be described by reference to the treatment of kaolin for the purposes of preparing the same for use as a size or filling for paper or the like, for the manufacture of pottery, and for other technical purposes: but it is to be understood that the method is equally applicable to the treatment of clays, fire-clays, glass-sand or the like. I have found that the yellowish or brownish tints of kaolin and like materials are usually associated with the presence of small proportions of iron, and are probably due to compounds in which the iron occurs in the ferric state, which compounds however cannot be effectively or economically removed by direct treatment with dilute mineral acids. Even in cases in which the coloring matter is relatively fugitive and is destroyed or lessened in effect by heat, I have found it to be due to iron or at least to be removed by treatment as hereinafter described, although in such cases the coloration has been commonly attributed to the presence of organic matter.

I may proceed substantially as follows: The kaolin or other material is suspended or immersed in water or in any suitable solution, and is treated therein with sulfureted hydrogen in any suitable manner, as for instance by bubbling the gas through the liquid or sludge. The effect of this treatment is to convert any iron compounds which may be present into ferrous sulfid, FeS, the presence of which is evidenced by a pronounced darkening or blackening of the mass. At this stage the material consists substantially of kaolin mixed with ferrous sulfid, and it is thereafter submitted to such oxidizing conditions as will convert the ferrous sulfid into ferrous sulfate or ferric sulfate or a mixture of these. This oxidation may be effected by the addition of small proportions of bleaching powder, preferably with the usual acid addition for decomposing it by treatment with chlorin or active oxidizing agents, or even by exposure to atmospheric air. This oxidation may in the case of certain clays containing both iron compounds and organic coloring matter, increase the decolorizing effect by the destruction or transformation of the latter. The iron salt or salts produced by this treatment are found to be readily removable by washing or leaching with water or dilute acid solutions, and the residual material is practically white and of high purity.

Instead of employing sulfureted hydrogen as above described, it will be understood that the conversion of ferric compounds into ferrous sulfid may be effected by the employment of suitable metallic sulfids.

It will be understood that the method of treatment described above may be applied as an intermediate step in the treatment of the material for other purposes; thus the preparation of pottery bodies is accomplished by macerating or washing the clay or kaolin with water, and the elimination of the coloring matter may be conveniently effected at this stage.

I claim:

The method of decolorizing kaolin, clay, or like material containing iron, which consists in subjecting the same in presence of water to the action of a reagent capable of producing ferrous sulfid, and then removing the ferrous sulfid by oxidizing the same and treating the material with a suitable solvent.

In testimony whereof, I affix my signature in presence of two witnesses.

KARL LANGENBECK.

Witnesses:
    CLINTON P. TOWNSEND,
    N. P. LEONARD.